(12) United States Patent
Alves et al.

(10) Patent No.: US 6,808,115 B2
(45) Date of Patent: *Oct. 26, 2004

(54) QUASI-COAXIAL OPTICAL BAR CODE READER

(75) Inventors: Kenneth W. Alves, Hatfield, PA (US); Thomas J. Brobst, Allentown, PA (US)

(73) Assignee: Accu-Sort Systems, Inc., Hatfield, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 621 days.

(21) Appl. No.: 09/152,016

(22) Filed: Sep. 11, 1998

(65) Prior Publication Data

US 2001/0010335 A1 Aug. 2, 2001

(51) Int. Cl.[7] .......................... G02B 26/12; G06K 7/10
(52) U.S. Cl. .................................................. 235/462.39
(58) Field of Search ..................... 235/462.39, 462.4; 359/216, 217, 218, 219

(56) References Cited

U.S. PATENT DOCUMENTS

| 3,813,140 A | 5/1974 | Knockeart | 350/7 |
|---|---|---|---|
| 3,970,825 A | * 7/1976 | Plockl | 235/467 |
| 4,115,703 A | 9/1978 | Dobras | 250/568 |
| 4,461,534 A | 7/1984 | Runciman | |
| 5,010,242 A | * 4/1991 | Frontino | 235/467 |
| 5,028,772 A | 7/1991 | Lapinski et al. | 235/567 |
| 5,262,628 A | 11/1993 | Shepard et al. | 235/472 |
| 5,314,631 A | * 5/1994 | Katoh et al. | 235/467 |
| 5,559,320 A | * 9/1996 | Loya | 235/467 |
| 6,135,352 A | * 10/2000 | Girotti | 235/454 |

FOREIGN PATENT DOCUMENTS

EP 0833273 A2 4/1998

OTHER PUBLICATIONS

"Polygonal Mirror Scanner With Uniform Return Signal" IBM Technical Disclosure Bulletin, vol. 32 Issue 6b, pp. 167–168, Nov. 1, 1989.*

* cited by examiner

Primary Examiner—Mark Tremblay
(74) Attorney, Agent, or Firm—Volpe and Koenig P.C.

(57) ABSTRACT

The present invention provides an inexpensive scanner that can scan at near to medium focal lengths. A light beam is generated to illuminate a target area on the scanned object. A mirrored surface directs the light beam towards the object and light reflected from the object to a detector. The detector is positioned to receive a constant amount of reflected light from the mirrored surface.

14 Claims, 5 Drawing Sheets

QUASI-COAXIAL OPTICAL BAR CODE READER

BACKGROUND OF THE INVENTION

1. Field of the Invention

This invention generally relates to scanners using light to read coded symbologies of varying reflectivity. More particularly, the invention pertains to scanners having rotating mirror wheels in the path of the laser light used to detect and read coded symbologies. Most particularly, the invention pertains to laser scanners having simplified optics for emitting and collecting the light used to read coded symbologies in near to medium focal ranges.

2. Description of the Prior Art

Coded symbologies, such as bar coded symbols, are well known. Coded symbols generally use light and dark areas of varying size in specified combinations. Each unique combination of light and dark areas represents encoded information. Coded symbology scanners read the code by passing a beam of light over it, collecting information in the form of light reflected back from the code, and decoding the collected information.

Prior art bar code scanners can be divided into two main categories, coaxial and non-coaxial. U.S. Pat. No. 5,028,772 is an example of a coaxial bar code reader. In this patent, a laser emits a beam of light which ultimately passes through an apertured mirror to a facet on a rotating polygon. The beam reflects off the facet through a second series of mirrors and towards a target surface. The light beam reflects off the target surface as diffused light. The diffused light passes back through the second series of mirrors towards a facet. The diffused light reflects off the facet towards the apertured mirror. All of the reflected light, except that which passes through the aperture, is directed towards a lens which focuses it onto a photo detector. Since the emitted light beam and the returned light follow the same path or axis, this scanner is referred to as coaxial. Coaxial scanners are particularly useful in reading surfaces at long focal lengths. During manufacture, coaxial scanners require testing and fine tuning to insure proper alignment of the laser, mirrors, polygon, lens and detector.

U.S. Pat. No. 5,262,628 is an example of a non-coaxial bar code reader. A laser emits a beam of light which is guided by a mirror towards a facet on a rotating polygon. The beam reflects off the facet towards the object. Upon striking the object, diffused light reflects off the surface. A detector is positioned at the front of the scanner to collect the diffused light. In this scanner, the emitted light beam and the detected light follow two distinct paths or axis. One axis is through the polygon to the surface. The other is from the surface directly to the detector. There is no attempt or means for focusing the diffused light on the detector. This scanner is referred to as non-coaxial.

Another example of a non-coaxial scanner is U.S. Pat. No. 3,813,140. The laser emits a beam of light directly towards a facet of the polygon. The beam reflects off the facet towards the target. The light reflected from the target is diffused and returns along a different axis to another facet of the polygon. This facet directs the diffused light towards a mirror. The mirror guides the diffused light towards a detector.

U.S. Pat. No. 4,115,703 is another example of non-coaxial scanner. The laser emits a beam of light directly at the surface to be scanned. The light reflects off the surface and passes through an aperture in the scanner located directly above the target area. The returned light passes through a lens barrel to a photo detector. To read a code, the scanner must be manually moved across the entire code. Non-coaxial scanners are inexpensive and effective at short focal lengths. At longer focal lengths, non-coaxial scanners are not as effective due to ambient light reaching the detector.

There exists a need for an inexpensive scanner that can scan at near to medium focal lengths of up to two feet from the target area.

SUMMARY OF THE INVENTION

The present invention provides an inexpensive scanner that can scan at near to medium focal lengths. A light beam is generated to illuminate a target area on the scanned object. A mirrored surface directs the light beam towards the object and light reflected from the object to a detector. The detector is positioned to receive a constant amount of reflected light from the mirrored surface.

DESCRIPTION OF THE PREFERRED EMBODIMENTS

The preferred embodiments will be described with reference to the drawn figures wherein like numerals represent like elements throughout. Scanner elements, such as chips, wiring, fasteners and brackets not necessary to discuss the features of the present invention are not illustrated as they will be known to those skilled in the art.

Figure 1:
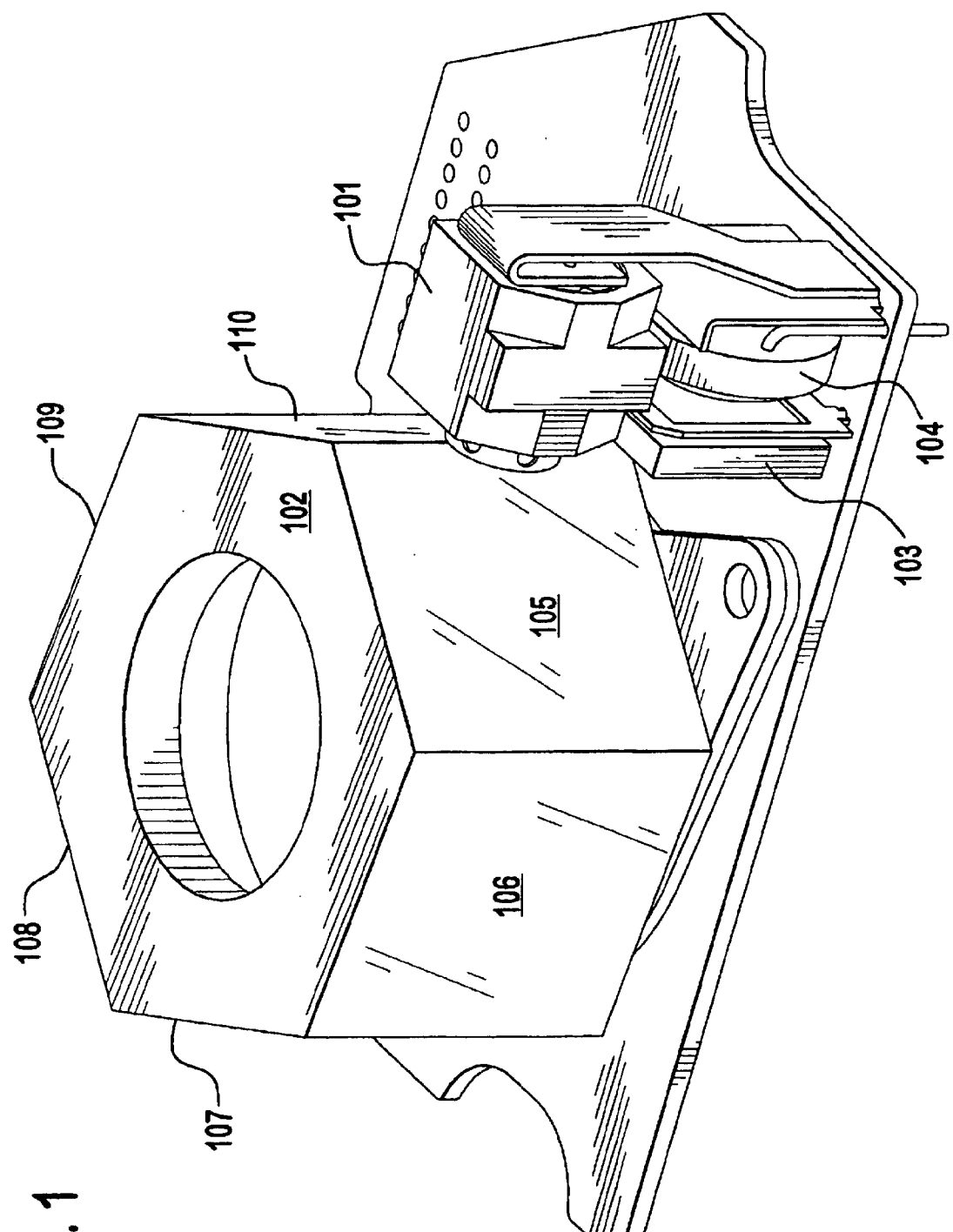
FIG. 1 is an isometric view of the elements of the present invention without all of the details of the scanner.

As illustrated in FIG. 1, the present invention has a laser diode assembly 101, such as Laser Diode Rohm RLD-65PC, a rotating polygon 102 with facets 105, 106, 107, 108, 109, 110, a filter 103, such as Spectro-Film B-34913, and a photo detector 104, such as PIN Photo Diode EG&G VTP4085.

Figure 2:
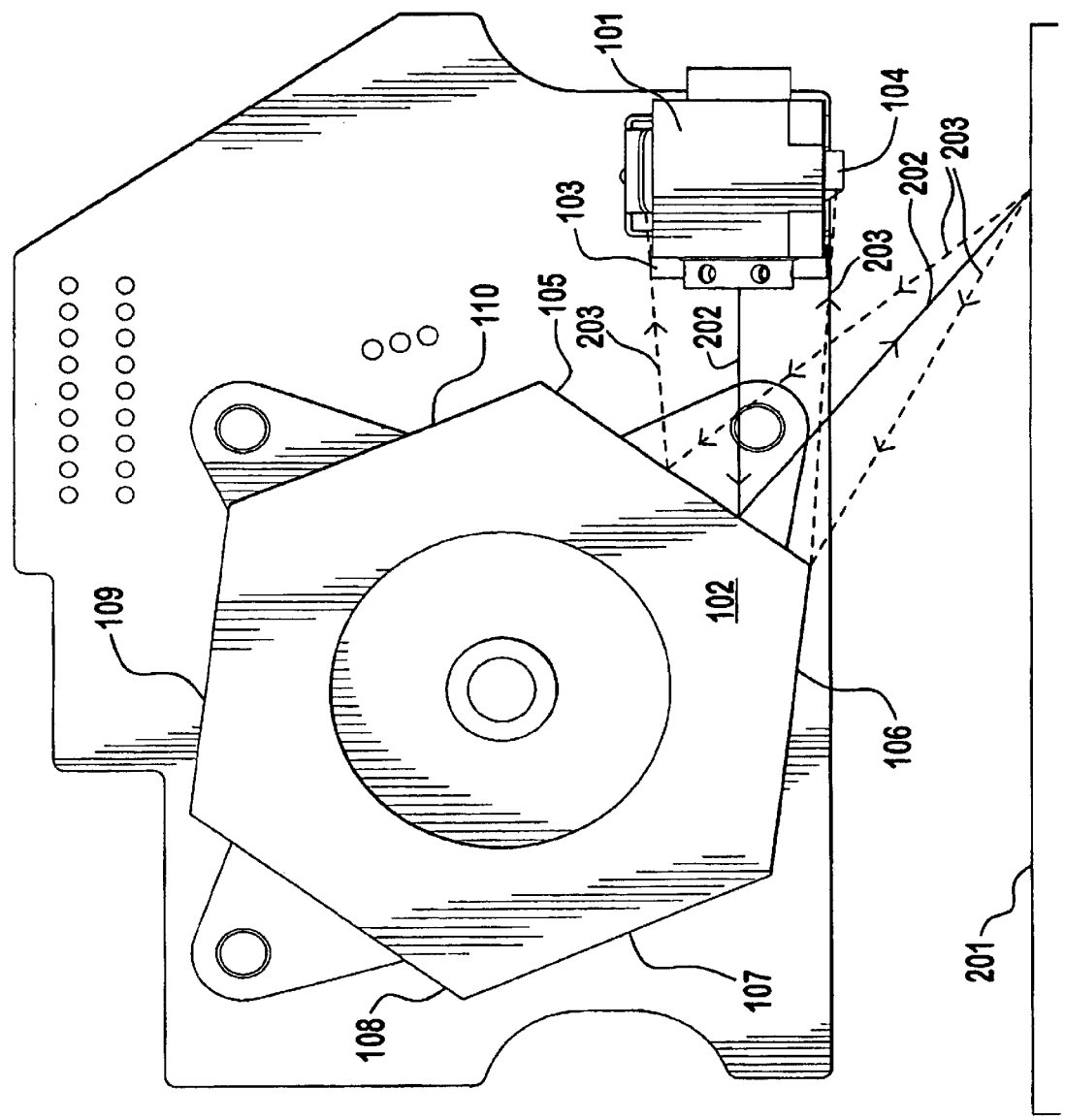
FIG. 2 is a top view diagram illustrating the light paths of the present invention to and from a target area.

As shown in the top view of FIG. 2, the laser assembly 101 emits a beam of light 202 towards the polygon 102. The beam 202 is reflected off the facet 105 of the polygon 102 toward the coded symbology 201. The beam 202 strikes the target 201 and is reflected as the diffused light 203. The diffused light 203 impinging on the facet 105 is reflected toward the filter 103 and the detector 104. The filter 103 only allows light which has the same wavelength as the emitted light beam 202 to pass through to the detector 104. Using the preferred components, the emitted light beam 202 has a wavelength of 655 nanometers and the filter 103 passes light within a 40 nanometer bandwidth centered around 660 nanometers. The reflected, diffused light 203 is collected by detector 104 and subsequently processed in a known manner and decoded.

Figure 3:
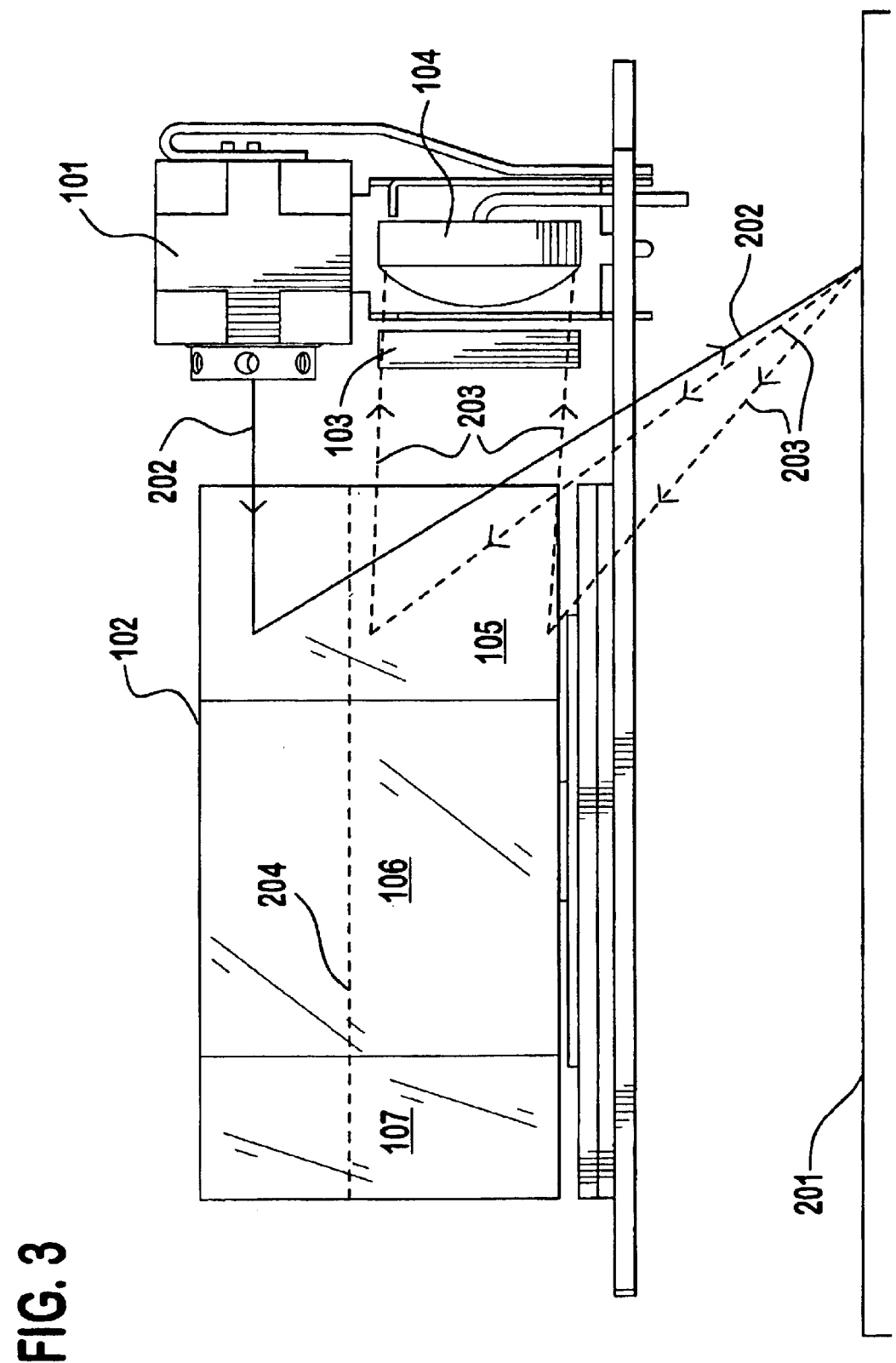
FIG. 3 is a side view diagram illustrating the light paths of the invention to and from a target area.

FIG. 3 is a side view of the present invention in a preferred arrangement. In this embodiment, the laser diode assembly 101 is located directly above the detector 104. In this view, it can be seen that the polygon height is increased over that of the prior art as indicated by dashed line 204 so that the laser diode assembly 101 and the detector 104 are pointed in the same direction but not on a common horizontal center. As a result, the laser beam 202 strikes the facet 105 towards the top. The diffused returning light 203 strikes the entire surface of the facet 105. While all of the diffused light is directed back in the direction of the filter 103 and detector 104, the detector 104 only collects the reflected light 203 that impinges on its surface area. Under the present arrangement, the polygon 102 allows the laser beam 202 to be centered about one axis and the detector 104 to be about another axis so that the diffused light 203 reflected on the detector 104 is not co-axial with the beam.

Figure 4:
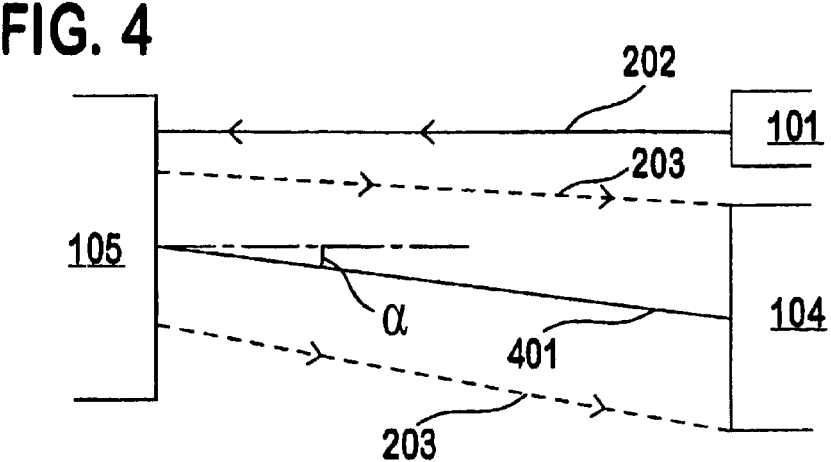
FIG. 4 illustrates the light paths between the laser diode assembly, detector and a facet.
Figure 5:
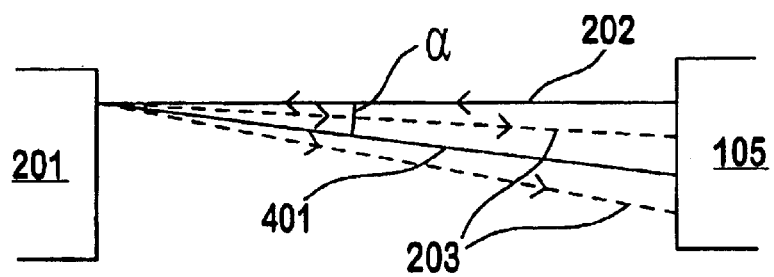
FIG. 5 illustrates the light paths between a facet and the scanned object.
Figure 6:
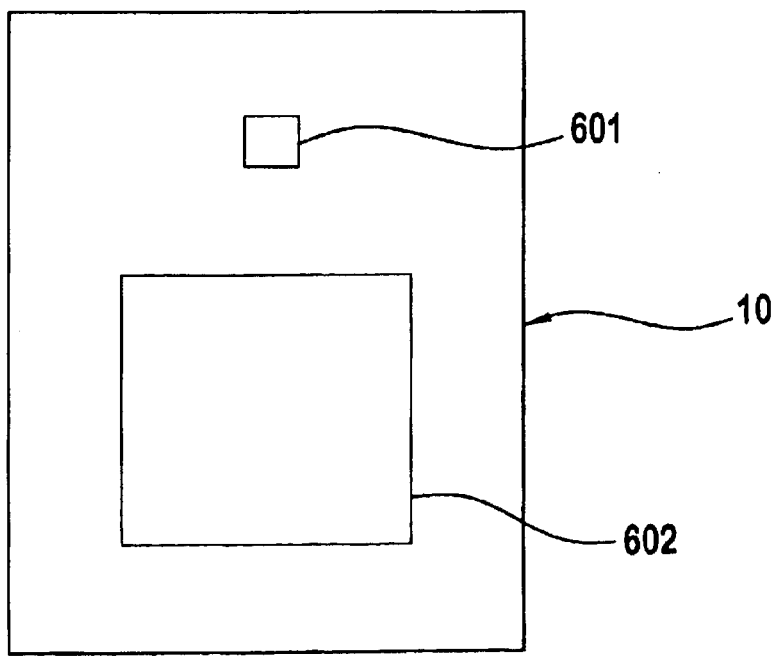
FIG. 6 illustrates the areas of the facet struck by the light traveling to the object and the light traveling to the detector.

Typically, coaxial scanners focus all of the diffused light 203 from facet 105 on the detector 104, and non-coaxial scanners do not use a facet or focus return light on the detector 104. In the present invention, the height of the polygon has been increased to avoid reflection of the laser beam 202 on the detector 104, and to eliminate the need for a focusing mirror in the return path. When viewed from above as in FIG. 2, the diffused light 203 encompasses the axis of the emitted light beam 202. As shown in FIGS. 4 and 5, the emitted beam 202, between the laser diode assembly 101 and the facet 105, is on a given centerline or emission path and the reflected light's centerline 401 is returning at an incident angle $\alpha$ based on its reflection from the object's surface 201. The return light 203 available to detector 104 strikes the facet 105 at a position 602 which is separate from and spaced from the beam's position 601 as shown in FIG. 6. Accordingly, the reflected light will be directed toward the detector 104 along a centerline 401 that is spaced from the centerline of beam 202. Since the emitted light beam 202 and the diffused light 203 travel similar but separate paths, the present invention may be termed quasi-coaxial.

When the facet 105 of the present embodiment is rotated during a sweep, the cross-section of the facet 105 facing the detector 104 varies. As a result, the area of light reflected toward the detector 104 varies. Because there is no means for focusing the returning diffused light 203 on the detector 104, the reflected diffused light varies in position relative to the detector 104.

Figure 7:
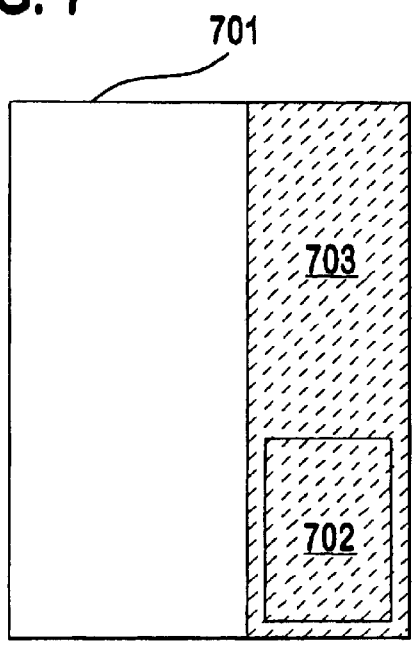
FIG. 7 illustrates the location of the detector's collecting surface in relation to the returned light when the polygon is returning the maximum amount of light.
Figure 8:
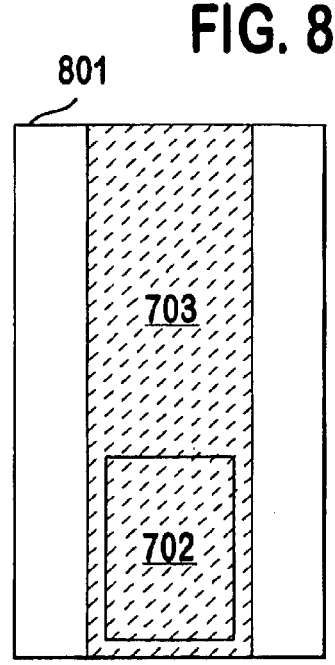
FIG. 8 illustrates the location of the collecting surface in relation for an intermediate amount of returned light.
Figure 9:
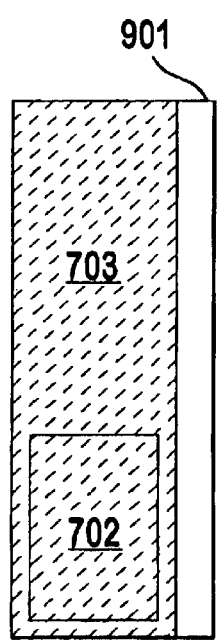
FIG. 9 illustrates the location of the collecting surface in relation to the minimum amount of returned light.

FIGS. 7, 8 and 9 show this variance in relation to the light collecting surface 702 of the stationary detector 104. FIG. 7 shows the area 701 of returned light when the polygon is rotated to return a maximum amount of diffused light. FIG. 8 shows the area 801, when the polygon is rotated to return an intermediate amount of diffused light. FIG. 9 shows the area 901, when the polygon is rotated to return a minimum amount of diffused light. As illustrated in these figures, there exists within each area an area 703 of returned diffused light 203 that will be constant regardless of the position of the polygon 102. In the present invention, the detector 104 is sized to have a collecting surface area 702 that is within the constant area 703. The detector 104 is then located at a distance from the rotating surface so that it will be at the confluence of the areas 703 regardless of the polygon's position. With this sizing and positioning, the collecting surface 702 will be in an area flooded by returned light and will be one hundred percent (100%) impinged by returned light. As a result, the detector 104 reacts as if it was seeing one hundred percent (100%) of the returned light at all times. Although allowing much of the returned light to pass by the detector's impingement surface 702 may seem inefficient, it has desirable properties. This construction avoids the need for apertured mirrors, in the path of the emitted light, to focus reflected light on the detector. This construction also takes advantage of the total impingement at all angles to avoid the need for precise location of the major components relative to each other. Additionally, the preferred filter 103 only allows light with an angle of incidence within a range centered about the mirror to the filter's surface to pass. The construction of the present invention returns the reflected diffused light at such an angle.

The present invention has been found to read codes up to two feet from the scanner, but the preferred range is within one foot from the scanner. In addition to its desirability for inexpensive fabrication, this simplified design minimizes testing and adjusting during manufacture and the need for field adjustments.

What is claimed is:

1. An apparatus for scanning an object comprising:
   means for generating a light beam;
   a rotatable mirrored surface positioned to directly receive the generated light beam from the light generating means and direct the generated light beam towards the object and the mirrored surface positioned to directly receive light reflected by the object; and
   means for detecting light positioned to directly receive the directed reflected light from the mirrored surface; and
   wherein as the rotatable mirrored surface rotates a cross section of the rotatable mirrored surface changes and the detector is sized and positioned to be fully illuminated in any rotation of the mirrored surface without focusing the directed reflected light when light reflects from the object.

2. The apparatus of claim 1 further comprising means for filtering light positioned between the mirrored surface and the light detecting means, the light filtering means only allowing light having the same wavelength as the generated light beam to pass to the light detecting means.

3. The apparatus of claim 1 wherein the light detecting means is positioned directly below the light generating means.

4. The apparatus of claim 1 wherein the light generating means and the light detecting means are positioned such that a center line of the generated light beam and a center line of the directed reflected light are quasi-coaxial.

5. The apparatus of claim 1 wherein the generated light reflects off of the mirrored surface in a separate portion of the mirrored surface than the directed reflected light received by the light detecting means reflects off of the mirrored surface.

6. An apparatus for scanning an object comprising:
   a laser diode for generating a light beam;
   a mirrored polygon having a plurality of facets, one of the plurality of facets positioned to directly receive the generated light beam from the light generating means and direct the generated light beam towards the object and the one facet positioned to directly receive light reflected by the object; and
   a light detector positioned to directly receive the directed reflected light from the one facet; and
   wherein as the mirrored polygon rotates a cross section of the one facet facing the detector changes and the light detector is sized and positioned to be fully illuminated in any polygon rotation without focusing the directed reflected light when light reflects from the object.

7. The apparatus of claim 6 further comprising a filter positioned between the one facet and the light detecting means, the filter only allows light having the same wavelength as the generated light beam to pass to the detector.

8. The apparatus of claim 6 wherein the mirrored polygon rotates and each facet of the plurality of facets, in turn, acts as the one facet.

9. The apparatus of claim 6 wherein the light detector is positioned below the laser diode and the generated light strikes the one facet in an upper portion and the directed reflected light received by the light detecting means strikes the one facet in a lower portion, the upper portion separate from the lower portion.

10. The apparatus of claim 8 wherein the object comprises a bar code and as the mirror polygon rotates the directed generated light passes over the bar code.

11. The apparatus of claim 6 further comprising a filter positioned between the one facet and the light detecting means, the filter only allows light having a same angle of incidence as light directed towards the light detecting means from the one facet.

12. An apparatus for scanning an object comprising:
means for generating a light beam;

a rotating mirrored polygon having a plurality of facets, one of the plurality of facets positioned to directly receive the generated light beam from the light generating means and direct the generated light beam towards the object and the one facet positioned to directly receive reflected light from the object and directing the reflected light towards a light detector means; and the light detector means positioned to directly receive the directed reflected light and sized to be fully illuminated in any polygon rotation without focusing the directed reflected light when the generated light reflects off of the object, the light detector means for detecting the directed reflected light.

13. The apparatus of claim 12 further comprising means for filtering light positioned between the one facet and the light detecting means, the light filtering means only allowing light having the same wavelength as the generated light beam to pass to the light detecting means.

14. The apparatus of claim 12 further comprising means for filtering light positioned between the one facet and the light detecting means, the light filtering means only allows light having the same angle of incidence as light from the one facet to the light detecting means.

* * * * *